(12) United States Patent
Conard

(10) Patent No.: US 9,011,234 B2
(45) Date of Patent: Apr. 21, 2015

(54) INTEGRATED CARD AND SLOT MACHINE MECHANIC

(71) Applicant: Electronic Arts Inc., Redwood City, CA (US)

(72) Inventor: Steven Conard, Bothell, WA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 14/027,511

(22) Filed: Sep. 16, 2013

(65) Prior Publication Data
US 2014/0018149 A1    Jan. 16, 2014

Related U.S. Application Data

(63) Continuation of application No. 13/788,995, filed on Mar. 7, 2013, now abandoned.

(60) Provisional application No. 61/639,834, filed on Apr. 27, 2012.

(51) Int. Cl.
| | | |
|---|---|---|
| A63F 13/00 | (2014.01) | |
| G07F 17/34 | (2006.01) | |
| G07F 17/32 | (2006.01) | |

(52) U.S. Cl.
CPC ............ *G07F 17/34* (2013.01); *G07F 17/3262* (2013.01)

(58) Field of Classification Search
CPC ... G07F 17/32; G07F 17/323; G07F 17/3262; G07F 17/3267; G07F 17/3227; G07F 17/326; G07F 17/3213; G07F 17/3272; G07F 17/3293; G07F 17/34; G06Q 10/0637
USPC ................................................ 463/16–21, 25
See application file for complete search history.

(56) References Cited

U.S. PATENT DOCUMENTS

| | | | | |
|---|---|---|---|---|
| 4,790,537 | A  * | 12/1988 | Smyth et al. ............... 273/143 R |
| 6,270,412 | B1 * | 8/2001 | Crawford et al. ............... 463/20 |
| 6,604,740 | B1 * | 8/2003 | Singer et al. .................. 273/292 |
| 8,608,543 | B2 * | 12/2013 | Cuddy et al. .................... 463/20 |
| 2005/0043092 | A1 * | 2/2005 | Gauselmann .................. 463/36 |
| 2006/0068892 | A1 * | 3/2006 | Gomez et al. .................. 463/20 |
| 2006/0116192 | A1 * | 6/2006 | Okada ............................. 463/20 |
| 2007/0287523 | A1 * | 12/2007 | Esses et al. ..................... 463/20 |
| 2009/0117989 | A1 * | 5/2009 | Arezina et al. ................. 463/20 |
| 2010/0279764 | A1 * | 11/2010 | Allen et al. ..................... 463/25 |
| 2011/0143830 | A1 * | 6/2011 | Fine ................................ 463/20 |
| 2012/0282995 | A1 * | 11/2012 | Allen et al. ..................... 463/22 |
| 2013/0137503 | A1 * | 5/2013 | Baerlocher ..................... 463/20 |

* cited by examiner

*Primary Examiner* — Justin Myhr
(74) *Attorney, Agent, or Firm* — Lowenstein Sandler LLP

(57) ABSTRACT

Embodiments described herein allow the users to influence various aspects of a game by selecting digital objects associated with a user's digital object collection to be integrated into customized digital object holders to provide a slot machine like functionality. Each of the digital object holders can have a number of positions, and each position can have a digital object associated with it. The user can choose which digital objects are associated with each digital object holder, in accordance with a rule set which can control which digital object can be associated with the digital object holder.

18 Claims, 12 Drawing Sheets

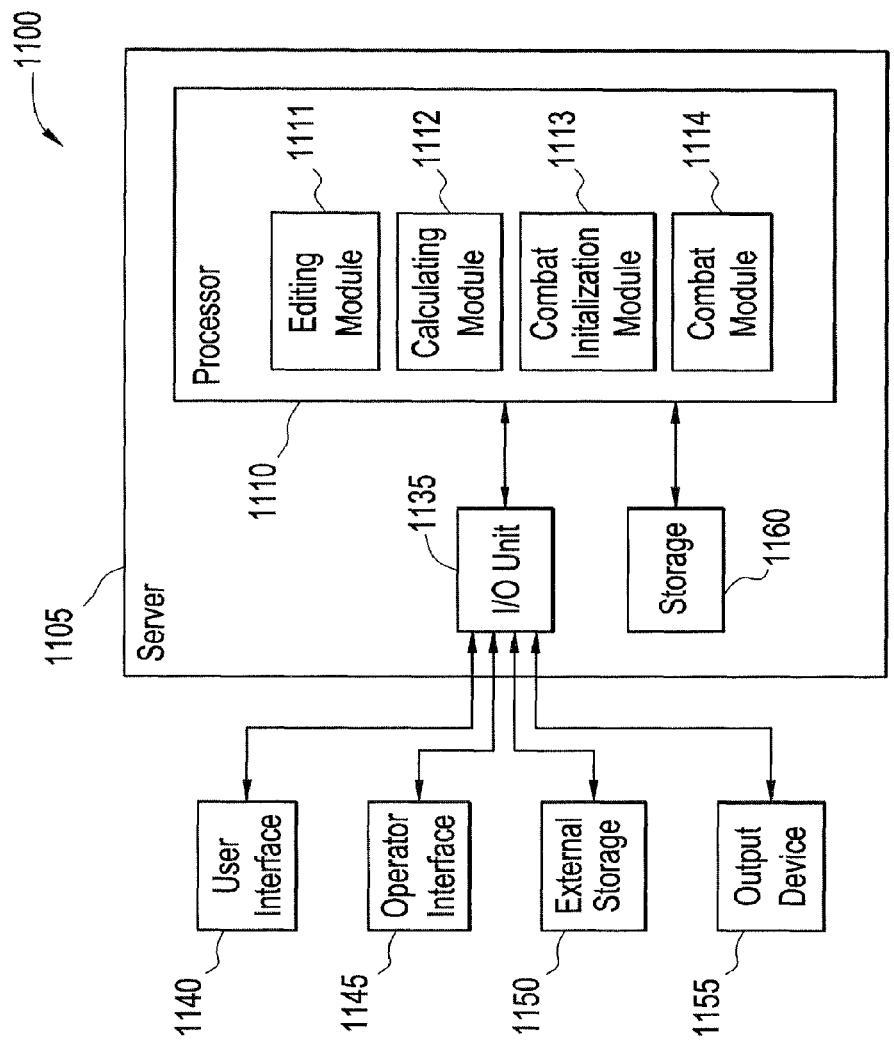

INTEGRATED CARD AND SLOT MACHINE MECHANIC

This is a continuation of U.S. application Ser. No. 13/788,995 filed on Mar. 7, 2013, now pending, which claims priority from U.S. Provisional Application No. 61/639,834, filed Apr. 27, 2012, the entire disclosures of which prior applications are incorporated herein by reference in their entirety.

BACKGROUND

1. Field

Example embodiments described herein are generally related to interactive entertainment, and more specifically, to an integrated card and slot machine mechanic that can be used for games.

2. Related Art

There are various multi-player card games in the related art where two or more players compete against each other in a head-to-head or group battle fashion. In such related art games, each player can customize their own deck for competing against other players. When players compete against each other, each player draws a specified number of cards from their respective deck to form a hand, and play a certain number of cards from their hand against their respective opponent. The specified number of cards and the rules for governing the hand and the effect of each card vary depending on the multi-player card game.

In these related art multi-player card games, there are several drawbacks. The ruleset of each individual card may be complicated, such that user intervention may be needed to interpret the effect of a played card and the given result of playing the card. Further, as each user is only associated with a single deck of cards, the user may be limited in the ability to design possible outcomes, and desired effects for drawing a hand or obtaining a desired card combination.

There are various configurations of slot machines in the related art. Slot machines in the related art may involve reels that spin randomly to produce an outcome on a payline, from which payout is calculated by using a paytable. However, the reels and the paytable are not configurable by the player, and slot machines have not been used in a competitive setting where the outcome of the payline of one player is used to affect the game state of a second player.

SUMMARY

Aspects of the embodiments may include a non-transitory computer readable medium storing executable instructions for editing digital object holders for use in a game. The instructions may include receiving a request to place a digital object associated with a visual representation and a ruleset for using the digital object, at a position on one of the digital object holders; applying the ruleset to the request to generate a first validation result; providing a first indication of a placement of the requested digital object in the requested position; and calculating a paytable that incorporates the request, the paytable comprising a set of possible outcomes for a random selection of one digital object from each of one or more of the plurality of digital object holders; wherein the providing and the calculating are performed for the first validation result having a first value indicative of the request being valid.

Additional aspects of the embodiments may include a non-transitory computer readable medium storing executable instructions for playing a game between a first player and a second player. The instructions may include receiving a first plurality of digital objects arranged in a first plurality of digital object holders, and a first paytable for the first plurality of digital object holders associated with the first player, and a first game state of the first player; and receiving a second plurality of digital objects arranged in a second plurality of digital object holders, and a second paytable for the second plurality of digital object holders associated with the second player, and a second game state of the second player. In response to receiving a first spin command associated with the first player on a first turn, instructions may be executed for each of the first plurality of digital object holders for selecting a first digital object for inclusion in a first payline. In response to receiving a second spin command associated with the second player on a second turn, instructions may be executed for each of the second plurality of digital object holders for selecting a second digital object for inclusion in a second payline.

Additional aspects of the embodiments include a system, which may involve an editing module for editing digital object holders for use in a game. The editing module may be configured to receive a request to place a digital object associated with a visual representation and a ruleset for using the digital object, at a position on one of the digital object holders; apply the ruleset to the request to generate a first validation result; and provide a first indication of a placement of the requested digital object in the requested position. A calculating module may also be configured to calculate a paytable that incorporates the request, the paytable comprising a set of possible outcomes for a random selection of one digital object from each of one or more of the plurality of digital object holders. The providing and the calculating may be performed for the first validation result having a first value indicative of the request being valid.

Additional aspects of the embodiments include a system, which may involve a combat initialization module that is configured to receive a first plurality of digital objects arranged in a first plurality of digital object holders, and a first paytable for the first plurality of digital object holders associated with the first player, and a first game state of the first player; and receive a second plurality of digital objects arranged in a second plurality of digital object holders, and a second paytable for the second plurality of digital object holders associated with the second player, and a second game state of the second player. A combat module may be used for initiating a game between a first player and a second player. In response to receiving a first spin command associated with the first player on a first turn, for each of the first plurality of digital object holders, the combat module may be configured to select a first digital object for inclusion in a first payline. In response to receiving a second spin command associated with the second player on a second turn, for each of the second plurality of digital object holders, the combat module may be configured to select a second digital object for inclusion in a second payline.

BRIEF DESCRIPTION OF THE DRAWINGS

FIG. 11 illustrates an example computer system on which example embodiments may be implemented.

DETAILED DESCRIPTION

In the following detailed description of example embodiments, reference will be made to the accompanying drawings, in which identical functional elements are designated with like numerals. The aforementioned accompanying drawings show by way of illustration, and not by way of limitation, example embodiments and implementations. These implementations are described in sufficient detail to enable those skilled in the art, and it is to be understood that other implementations may be utilized and that structural changes and/or substitutions of various elements may be made without departing from the scope and spirit of the example embodiments. The following detailed description is, therefore, not to be construed in a limited sense.

Example embodiments described herein are directed to providing a game that incorporates a slot machine-like functionality. Digital object holders can perform a function like reels in a slot machine to randomly or deterministically generate an outcome for each digital object holder (for example, but not limited to, a tile in a reel of an online slot machine game) and to compare the outcome with a payline to determine a result. An interface is provided to allow the user to customize digital object holders by placing each digital object in a desired position at a desired digital object holder. The placement of the digital objects can be governed by a ruleset associated with each digital object. Based on the placement of the digital object, a paytable can be determined from the possible outcomes by randomly selecting a digital object from one or more of the digital object holders.

During the game, the player can invoke a slot machine-like functionality to randomly select digital objects from (e.g. "spin") the digital object holders, whereupon the digital object holders can perform a function like reels to generate an outcome on a payline. The payline outcome can be matched to a paytable to determine the result of the payline.

In contrast to the related art, which is restricted to one deck per user, the user can customize and incorporate multiple digital object holders and generate a paytable indicating one or more possible outcomes that result on the payline from "spinning" the digital object holders (e.g., randomly selecting a digital object from each digital object holder). Further, because the payline result can be adjudicated by a paytable, human intervention for interpreting the effect of the result can be substantially reduced in certain example embodiments, and substantially eliminated.

Figure 1A:
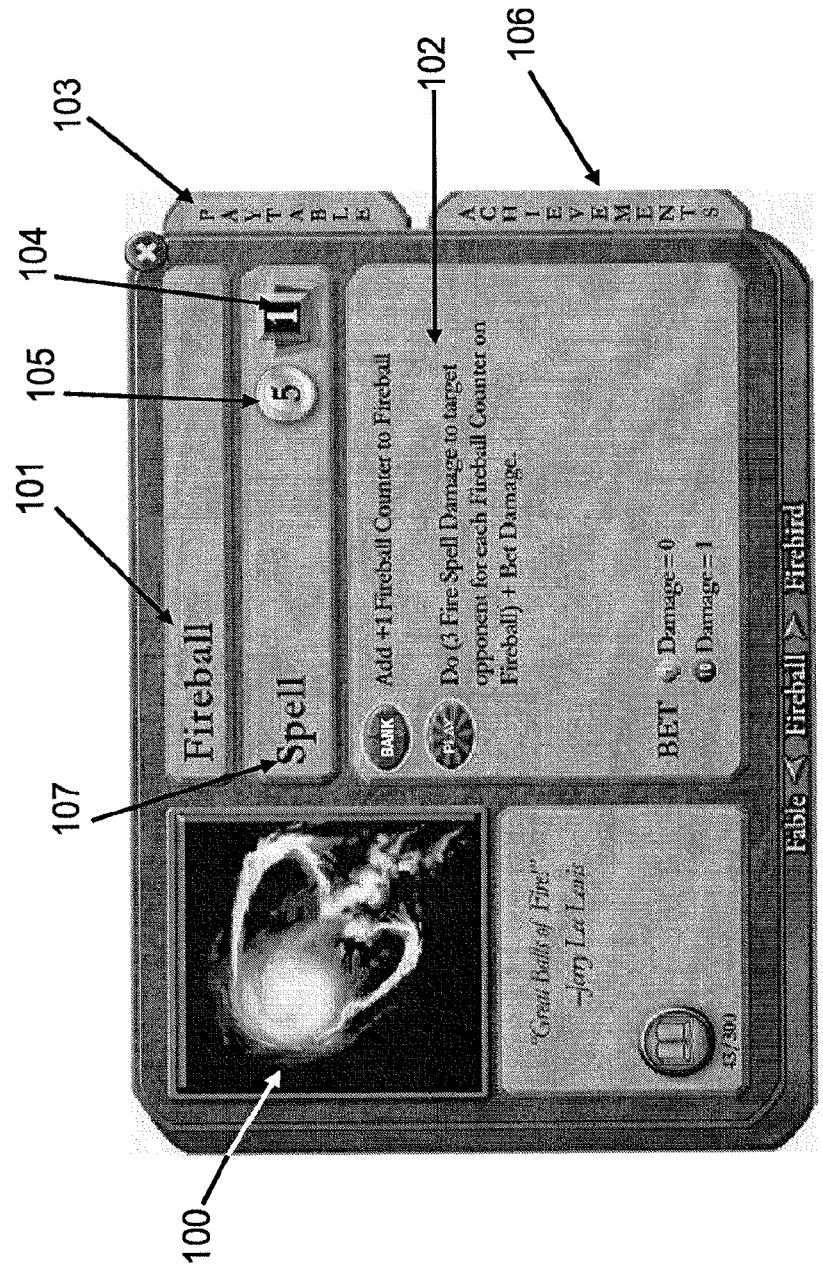
FIG. 1A and FIG. 1B illustrate two implementations of a digital object, in accordance with example embodiments.
Figure 1B:
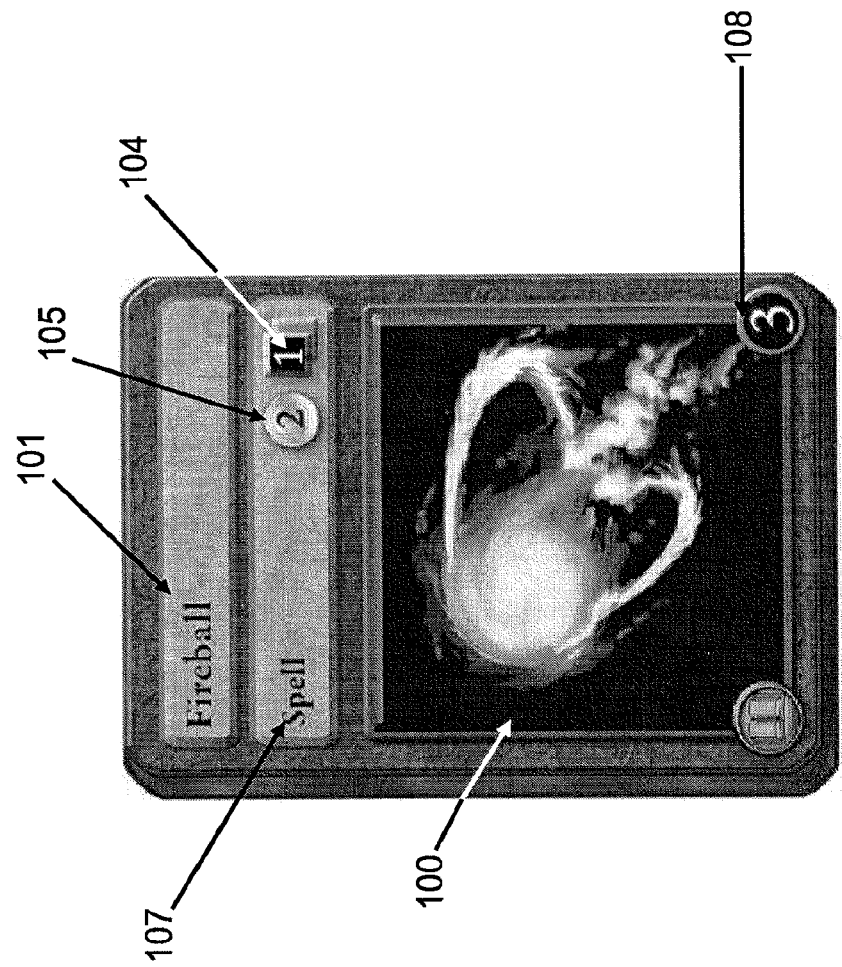

FIGS. 1A and 1B illustrate two implementations of a digital object, in accordance with example embodiments. In the example of FIG. 1A, the digital object may include a visual representation 100 for the appearance of the digital object when it is placed on the payline.

The digital object 100 may also have a name 101, ability information 102, paytable information 103, an indicator 104 to indicate a number of positions used in the digital object holder to place the digital object, a cost 105 to play the digital object, and an indication of the type 107 of the digital object. Other additional information, such as achievements 106 for playing the digital object can also be added. In the example of FIG. 1A, the digital object 100 has the name of "Fireball" 101, with an indicator 104 to indicate that the digital object 100 will take up one position in a digital object holder, that the cost 105 to play the digital object is five units, and that the type 107 of the digital object is a spell.

The ability information 102 indicates possible abilities for the digital object when the digital object appears in a payline. For example, the ability information 102 may indicate effects resulting from a user decision to bank a payline (e.g., banking the digital objects on the payline as counters for use in a future payline, etc.), and effects resulting from a user decision to play the payline (e.g., use the effects according to the paytable, select specific combinations within the paytable to invoke an effect, etc.).

In the example depicted in FIG. 1A, the ability information 102 indicates that for a "bank" decision, an additional counter is added to future "Fireball" digital objects should they appear in a future payline. The ability information 102 further indicates that for a "play" decision, the digital object will conduct three fire spell damage to a target opponent for each "Fireball" counter added to the digital object plus bet damage inferred from the cost 105 of playing the digital object.

In the example of FIG. 1B, the digital object may be represented differently for gameplay or for an interface for editing digital object holders. For example, in the representation of FIG. 1B, a digital object number indicator 108 can be provided to indicate how many digital objects a user has available for placement in the digital object holders. In the example of FIG. 1B, the user has three "Fireball" digital objects available for placement in digital object holders. Other parts of the digital object may remain the same, depending on the desired implementation.

The examples of FIGS. 1A and 1B illustrate a few implementations out of numerous possibilities for a digital object, depending on a desired implementation or design of a game. Digital objects can have other abilities, such as, but not limited to, affecting the player's or opponent's game state (e.g., health points, amount of money, restrictions, decreasing damage received, loss of a turn, type of damage received, etc.), the player's or opponent's digital object holders (e.g., reserving an option to nudge a digital object holder up or down a number of positions of a player's or opponent's payline, destroying or disabling digital objects in the digital object holders of an opponent, etc.), and so forth. One of ordinary skill in the art can recognize and implement any variation of a digital object to meet the design or implementation of a particular game.

Figure 2:
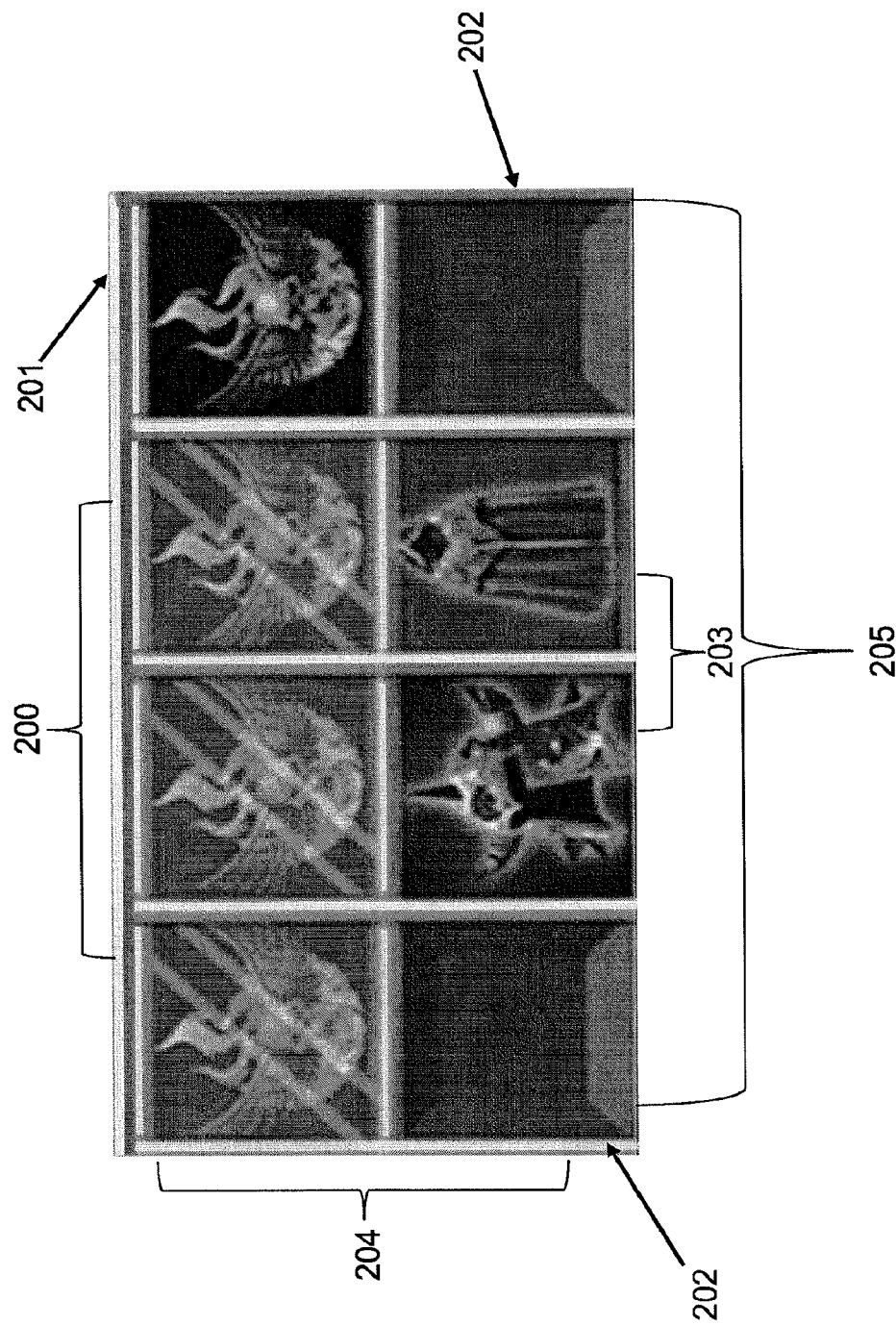
FIG. 2 illustrates an example of a placement of digital objects in digital object holders, in accordance with an example embodiment.

FIG. 2 illustrates an example of a placement of digital objects in digital object holders, in accordance with an example embodiment. The placement of a digital object in a digital object holder may be subject to ruleset restrictions. In the example of FIG. 2, there are four digital object holders 205 (as represented by the columns of FIG. 2), with up to two positions 204 available per digital object holder (as represented by the rows of FIG. 2). In the example of FIG. 2, digital objects 203 with indicators indicating that the digital object will use one position may be placed in freely available positions of the reels. Because the digital object occupies one position, other positions in the digital object holder may be indicated as freely available, as shown at reference numeral 202.

The digital object 201 is an example of a digital object that requires four positions for placement, according to the ruleset. Accordingly, when digital object 201 is placed, "null" digital objects 200 fill up other positions for other digital object holders, to indicate that the position is consumed by a null digital object. The null digital objects 200 provide an indication for the user to understand that the null digital object is linked to the placement of digital object 201.

However, the null digital objects 200 do not have to be blank or null in nature. For example, the null digital objects could have an ability that provides a beneficial or detrimental effect during gameplay to balance the effect of digital object 201. One of ordinary skill in the art can recognize and implement any variation for the null objects 200 to meet the design or implementation of a particular game.

Figure 3:
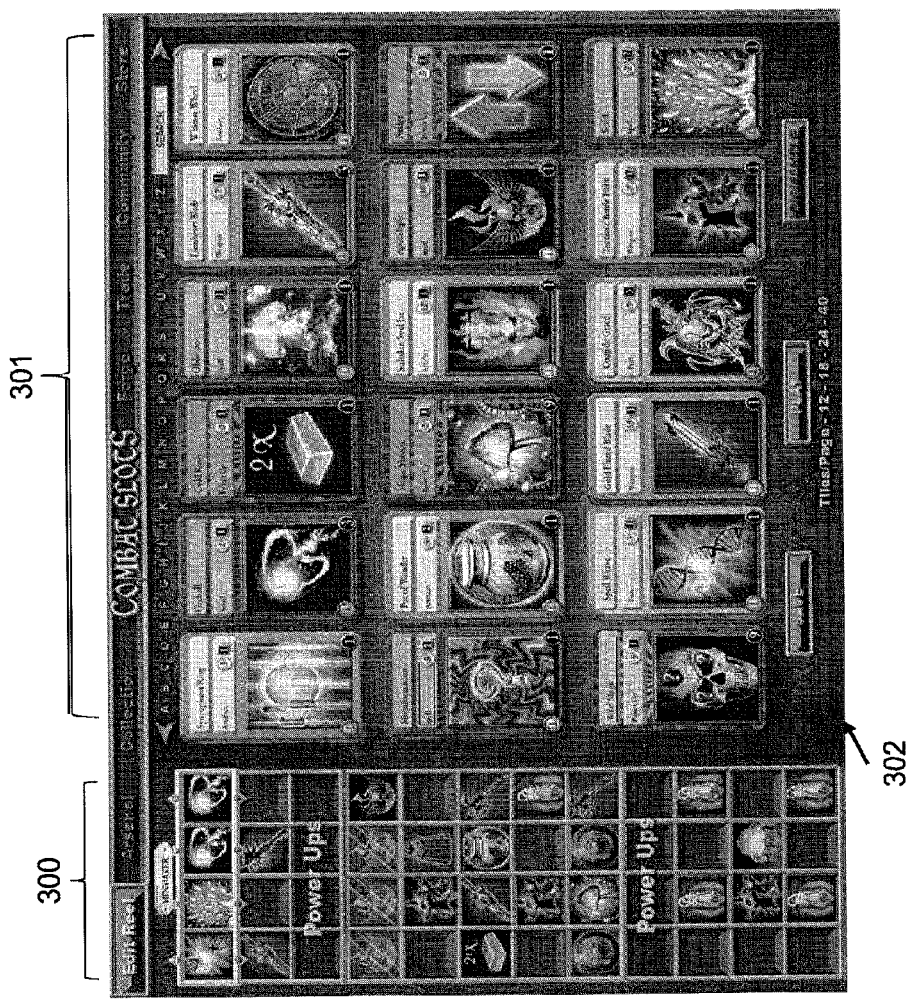
FIG. 3 illustrates an interface for editing digital object holders, in accordance with an example embodiment.

FIG. 3 illustrates an interface for editing digital object holders, in accordance with an example embodiment.

In the example of FIG. 3, an interface 302 is provided with a first section 300 illustrating the present configuration of the user's digital object holders, and a second section 301 illustrating the digital objects available to the user for placement in the digital object holders. In the first section 300, four digital object holders, represented as columns, are provided for configuration. However, any number of digital object holders may be used, depending on the implementation of the game. In the second section 301, the representation as shown in FIG. 1B can be used for the digital objects. However, other configurations are also possible.

The interface 302 allows the user to place a digital object in a digital object holder as desired (e.g., by drag and drop, by clicking on a mouse and selecting an open position in the digital object holder, etc.). The placement may be governed by a ruleset associated with the selected digital object. Based on the placement of the digital object, a paytable may be calculated for the digital object holders.

Figure 4:
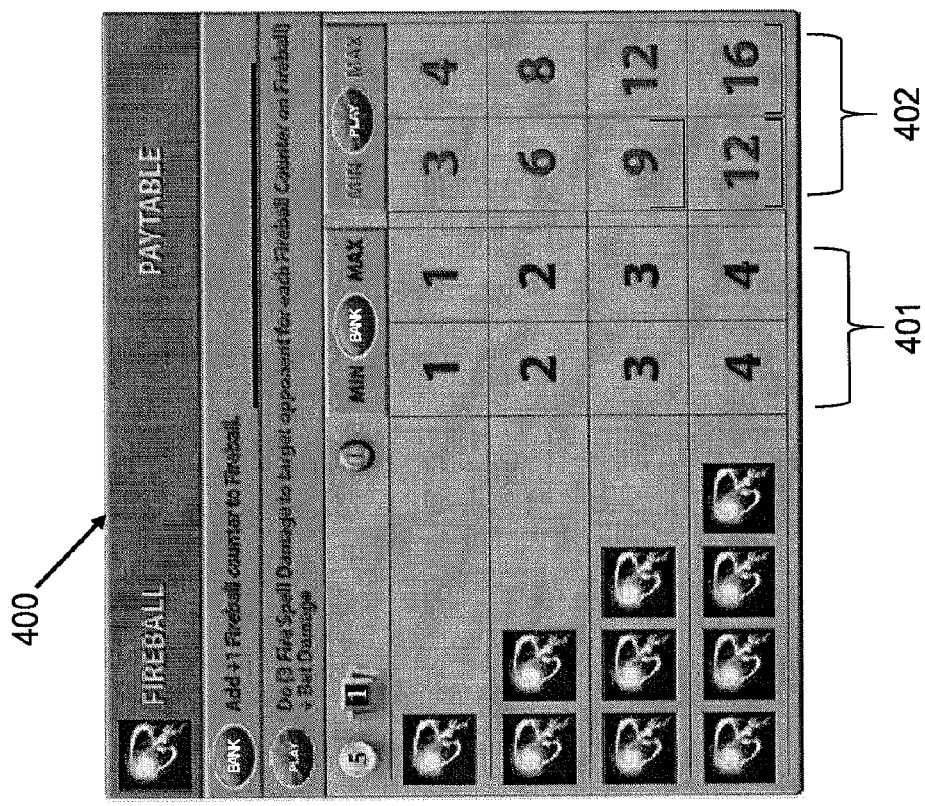
FIG. 4 illustrates a digital object paytable with digital object payoff information, in accordance with an example embodiment.

FIG. 4 illustrates a digital object paytable with digital object payoff information, in accordance with an example embodiment. Each digital object may be associated with a paytable 400 containing information, such as payoff information for the digital object as shown in FIG. 4. The digital object payoff information may include digital object bank decision payoff information 401 and digital object play decision payoff information 402. The digital object bank decision payoff information 401 and digital object play decision payoff information 402 may be utilized to construct a paytable for the digital object holders to indicate payoff information for a bank decision and a play decision.

In the example of FIG. 4, the digital object "Fireball" is associated with bank decision payoff information 401 indicating a number of counters that will be accumulated for playing a future "Fireball" digital object, in response to a bank decision. The play decision payoff information 402 indicates an amount of damage that can be conducted against an opponent's game state (e.g., hit points), with a minimum damage restriction and a maximum damage restriction.

Figure 5:
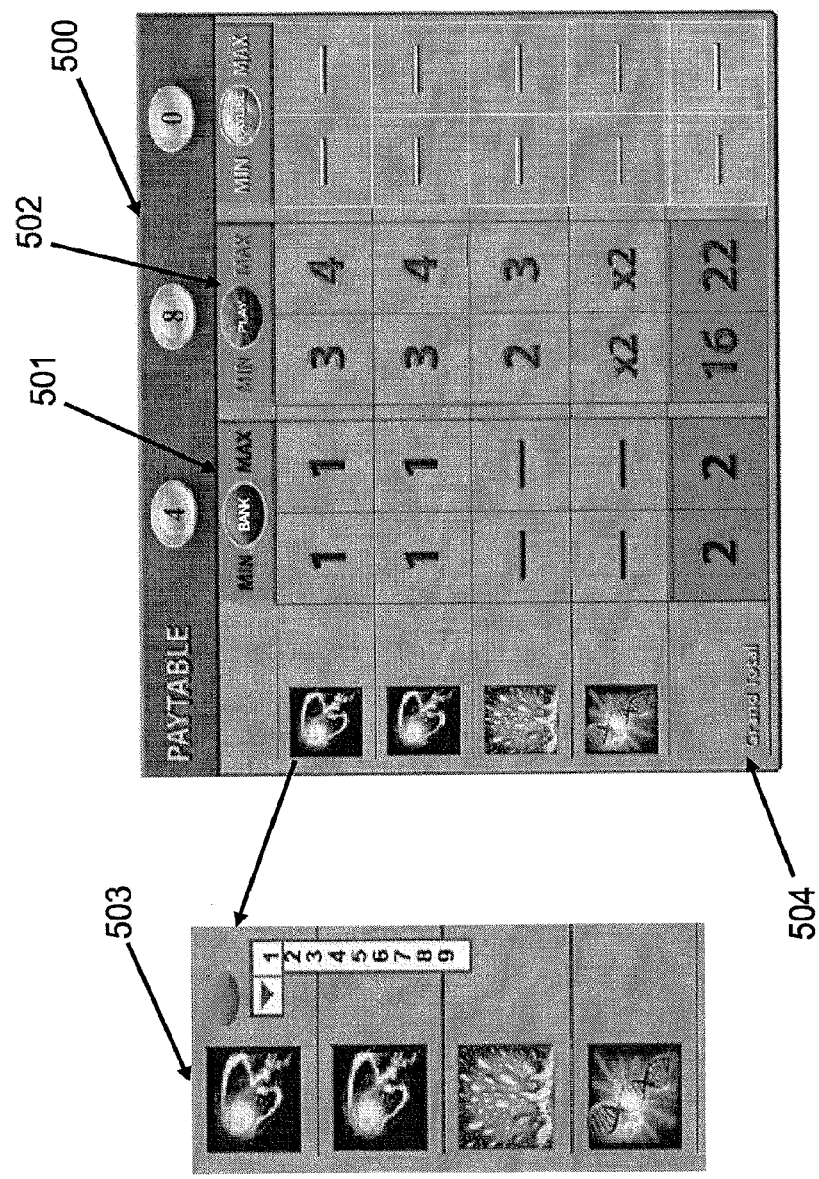
FIG. 5 illustrates a paytable for the digital object holders, in accordance with an example embodiment.

FIG. 5 illustrates a paytable 500 for the digital object holders, in accordance with an example embodiment. The paytable 500 provides game play information to help players construct and configure their digital object holders. In an example implementation, a paytable calculation module can auto calculate digital object combinations (e.g., damage and/or combat effects) and provide possible outcomes. Providing the outcome "combat combination results" of what will happen when the digital objects land on the payline during game play. The Pay Table can calculate combination results from one to four digital objects—one digital object per digital object holder.

In the example of FIG. 5, a possible outcome of the digital object holders of FIG. 3 is indicated in the paytable 500. Based on the possible outcome, bank decision payoff information 501 and play decision payoff information 502 for the paytable 500 can be calculated to determine an overall resolution 504 for the bank decision and the play decision. An additional interface 503 can be used to permit the user to configure the paytable information, if desired. The configuration of the paytable is subject to a ruleset to determine validity, and if the configuration is considered to be valid, the paytable 500 may be updated accordingly.

Figure 6:
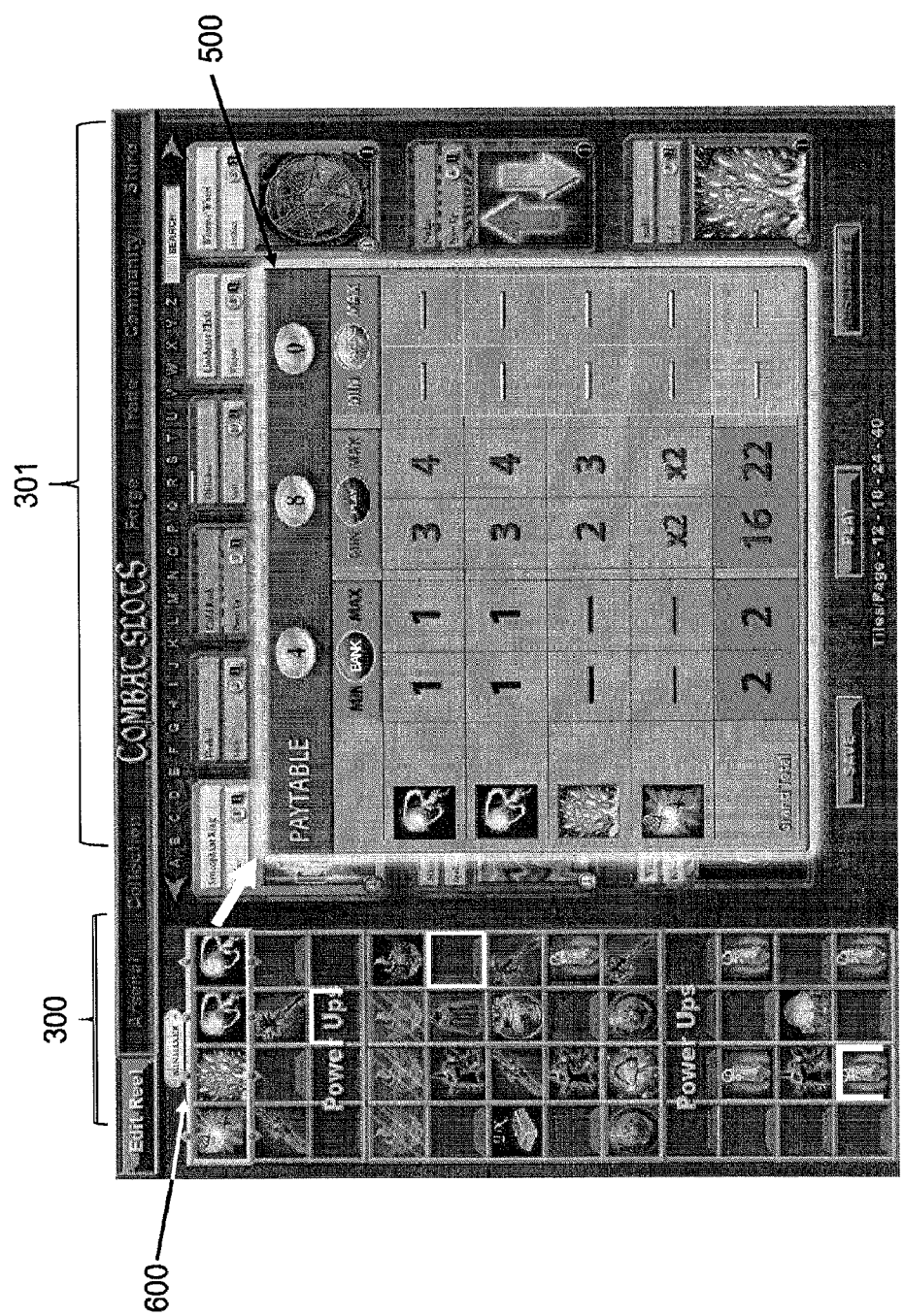
FIG. 6 illustrates a possible integration of the paytable with the interface of FIG. 3, in accordance with an example embodiment.

FIG. 6 illustrates a possible integration of the paytable with the interface of FIG. 3, in accordance with an example embodiment. In the interface, the user selects a possible outcome 600, whereupon the paytable 500 indicating the payoff information for the outcome 600 can be generated and displayed. In the example of FIG. 6, the selected outcome 600 results in a paytable of a minimum value and a maximum value of banking 2 for a "bank decision", and a minimum value and a maximum value of outputting 16 and 22 of damage, respectively, for a "play" decision.

In the example of FIG. 6, the selected possible outcome 600 is along the same row of the digital object holders, however, the embodiments are not restricted to this configuration. One of ordinary skill in the art can recognize that other game implementations can involve different definitions of outcomes (e.g., selecting one digital object from each digital object holder to indicate the result).

Figure 7:
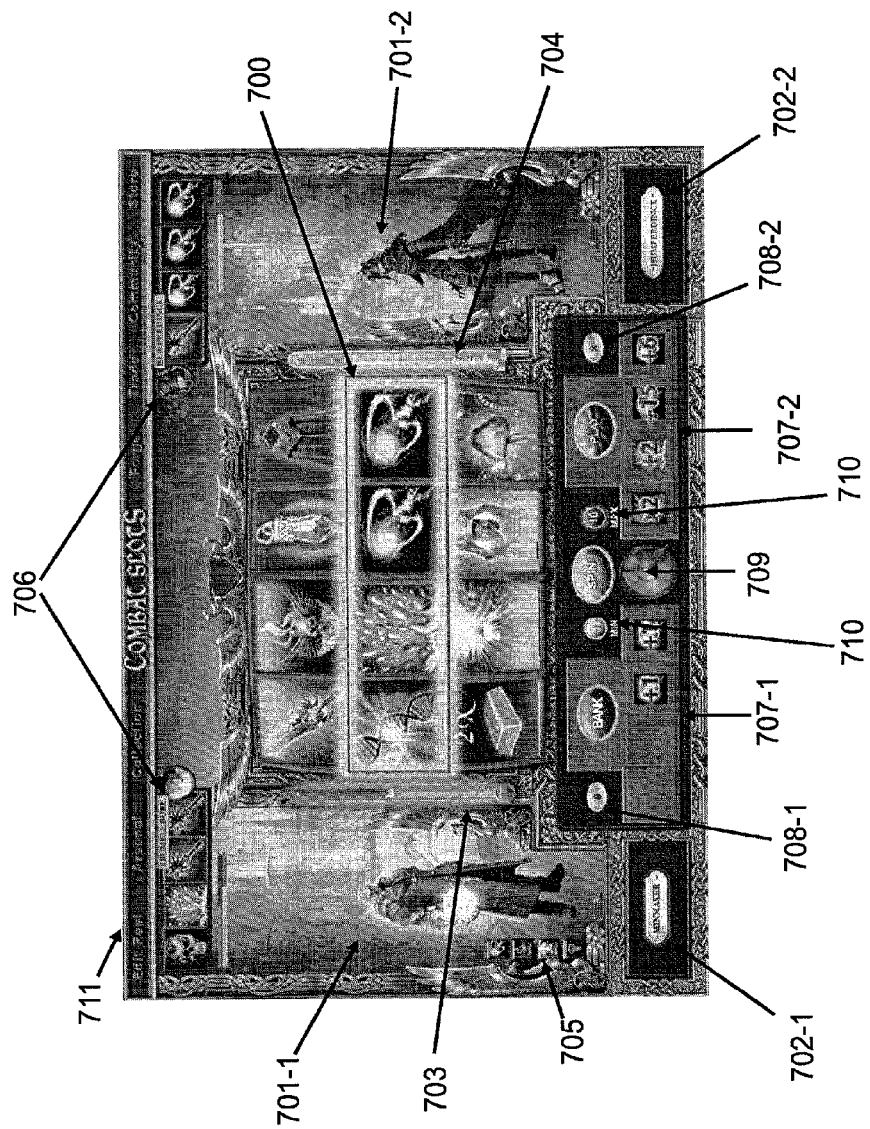
FIG. 7 illustrates an interface for playing a game, in accordance with an example embodiment.

FIG. 7 illustrates an interface for playing a game, in accordance with an example embodiment. In the example of FIG. 7, the digital objects and digital object holders are arranged in a slot machine like interface with a payline 700 indicating the outcome of randomly selecting a digital object from each digital object holder. Avatars (e.g., graphical representations of the player) can be used to identify either the player 701-1 or a targeted opponent 701-2. Nameplates can also be provided to identify the player 702-1 and the opponent 702-2.

Various indicators can be provided to indicate various game state aspects of the player, such as hit points 703, money units 704, and spells available to the user 705. Other indicators 706 can be provided to indicate an opponent's payline and game state as needed. A timer 709 may also be provided to force a decision from the player, whereupon a default action may be conducted if the timer elapses.

In the example interface of FIG. 7, the player "spins" the digital object holders like a slot machine until an outcome is produced on a payline 700, incorporating a randomly selected digital object from each digital object holder. The player can manually assign a wager and spin the digital object holders, or can also use betting buttons 710 to invoke a spin. Upon reaching an outcome of the payline 700, payoff information may be displayed to inform the user of the effect of a bank decision 707-1 or a play decision 707-2. Indicators can also be given to inform the player of the cost in money units to invoke a bank decision 708-1 or a play decision 708-2.

Additionally a global navigation bar 711 may be provided to allow the player to interact with other interfaces as needed. For example, if the player is not satisfied with the progress of the present game, the player may use the navigation bar 711 to bring up the interface for configuring the plurality of digital object holders, as in FIG. 3, during the course of the game with other opponents.

Although the example interface in FIG. 7 is in the form of a slot machine-like interface, other interfaces can also be implemented by one of ordinary skill in the art to provide a random selection of a digital object from each of the digital object holders to produce an outcome. For example, a series of graphical icons (e.g. a television, a window, etc.) representing the digital object holders can display randomly selected digital objects in the form of the payline. One of ordinary skill in the art can implement a wide variety of interfaces depending on the implementation of the game.

Figure 8:
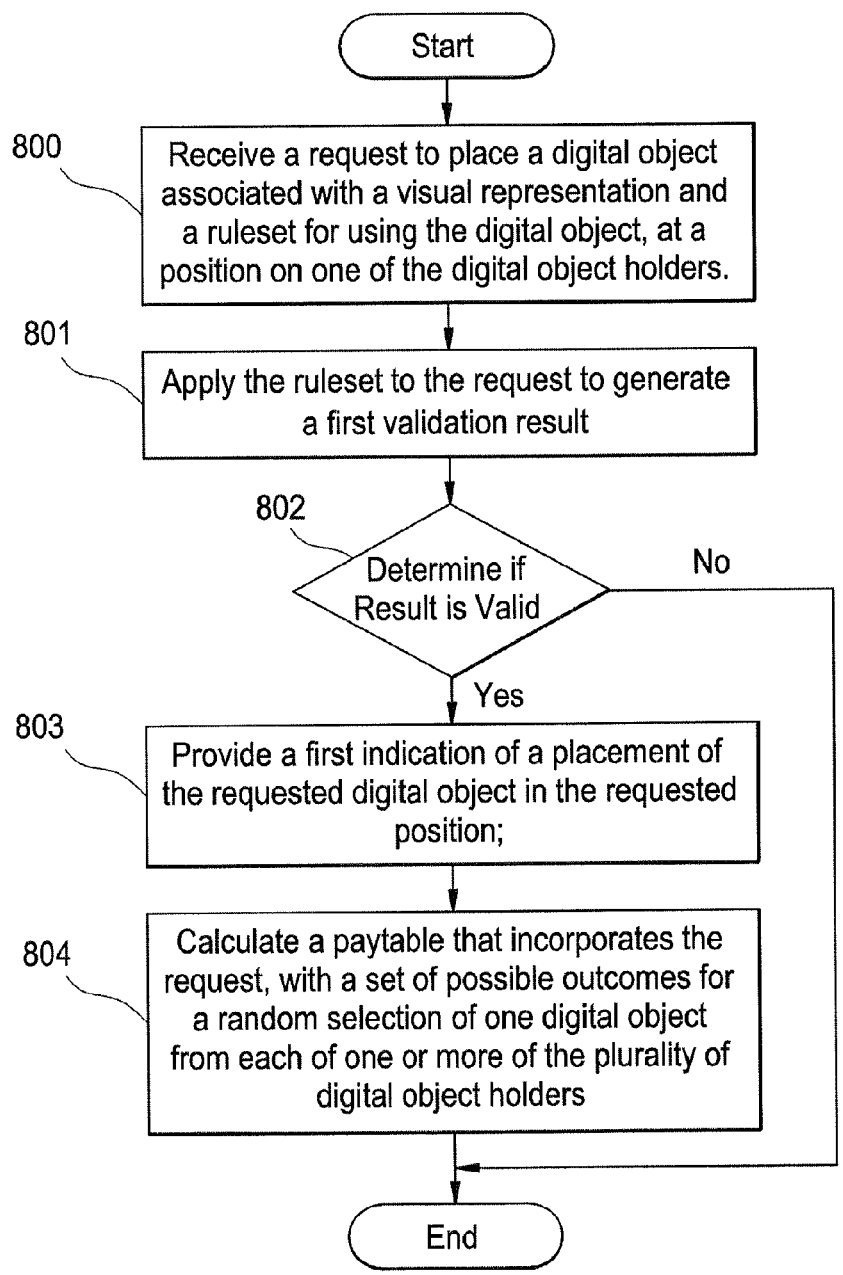
FIG. 8 illustrates a flow diagram for editing digital object holders for use in a game, in accordance with an example embodiment.

FIG. 8 illustrates a flow diagram for editing digital object holders for use in a game, in accordance with an example embodiment. A player who again may be provided with an initial collection of digital objects. The initial collection that is provided to the players may be a common default initial collection of digital objects that are commonly distributed to all the players. Alternatively, customized sets of digital objects may be distributed to players, or players may acquire through skill or purchase additional visual objects either at the start or during the process of gameplay. Any additional tile that are acquired by the player will be added to the collection of digital objects.

At 800, a request is received by an interface (e.g., as shown in FIG. 3) to place a user-selected digital object associated with a visual representation and a ruleset for using the digital object, at a position on one of the digital object holders. At 801, the ruleset is applied to the request to generate a first validation result. The ruleset may be processed by the user interface, a processor, or by other implementations.

Based on the application of the ruleset, if the result is determined to be not valid, at 802, the placement or association of the digital object with a position in the digital object holder may be rejected, and a message or other indication may be provided to inform the user of the placement determined to be invalid. Similarly, a determination may be made as to whether additional positions in the digital object holder are available, and if so, the additional positions may be evaluated for determination based on application of the ruleset.

If the result is determined to be valid, the interface proceeds to 803 to provide a first indication of a placement of the requested digital object in the requested position. At 804, the interface may calculate a paytable that incorporates the request, with a set of possible outcomes for a random selection of one digital object from each of one or more of the plurality of digital object holders.

Figure 9:
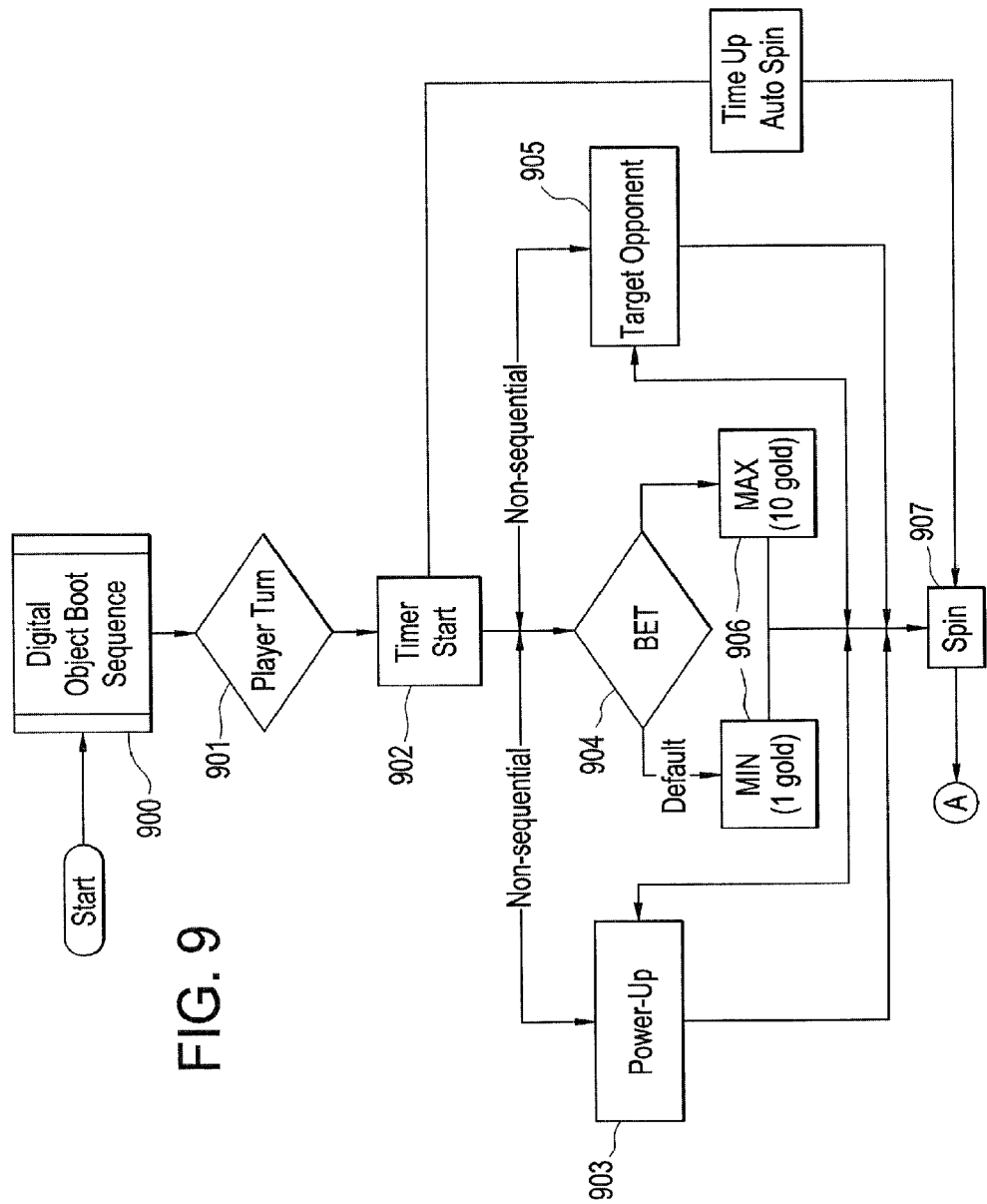
FIG. 9 illustrates a flow diagram for a game interface, in accordance with an example embodiment.

FIG. 9 illustrates a flow diagram for a game interface, in accordance with an example embodiment. In the example of FIG. 9, an interface such as FIG. 7 can have a flow for handling pre-combat decisions from the player, and the combat aspects of the game. FIG. 9 depicts an example flow diagram for handling pre-combat decisions from the player. At 900, the interface can perform a digital object boot sequence, wherein the digital objects and digital object holders of the player and one or more opponents are loaded.

For example, but not by way of limitation, the interface can receive a first plurality of digital objects arranged in a first plurality of digital object holders, and a first paytable for the first plurality of digital object holders associated with the first player, and a first game state (e.g., present hit points, present amount of gold, etc.) of the first player; and similarly receive a second plurality of digital objects arranged in a second plurality of digital object holders, and a second paytable for the second plurality of digital object holders associated with the second player, and a second game state of the second player.

At 901, the interface can determine whether the player or an opponent is to conduct a turn. In various implementations of the game, turns can be conducted simultaneously by the player and the one or more opponents, can be conducted sequentially (e.g., turns are given to each player alternately), or can be resolved by other methods known to one of ordinary skill in the art. In the example of FIG. 9, the interface has determined that the player's turn is to be resolved.

At 902, a timer can be used to force the player to commit to one or more decisions within a specific time span. If the timer elapses, then the interface can select a default action (e.g., force a "spin" action 907). The player can make various decisions during the time limit, such as (but not limited to) invoking power-ups garnered from previously played bank decisions 903, adjusting a wager if the game is implemented in a slot machine like manner 904, and targeting an opponent 905. The interface can also restrict wagering to a bet 906 (e.g., minimum or maximum), or can provide a freeform input interface to allow the player to wager as desired.

The player can also conduct the decisions in any order that the player desires or in a specific order, depending on the implementation of the game. The "spin" action 907 can be invoked after the player has chosen to invoke the action, or after a timer runs out (e.g., Time Up, Auto-Spin at 908). During the "spin" action 907, the interface can generate animations to indicate that a digital object is being randomly selected from each digital object holder for inclusion into a payline.

Additional actions may also be made available to the user by the interface. For example, if the user desires to configure the plurality of digital object holders to adjust to in-game situations, an option can be provided so that the user can recall the digital object holder interface (e.g., as shown in FIG. 3).

Figure 10:
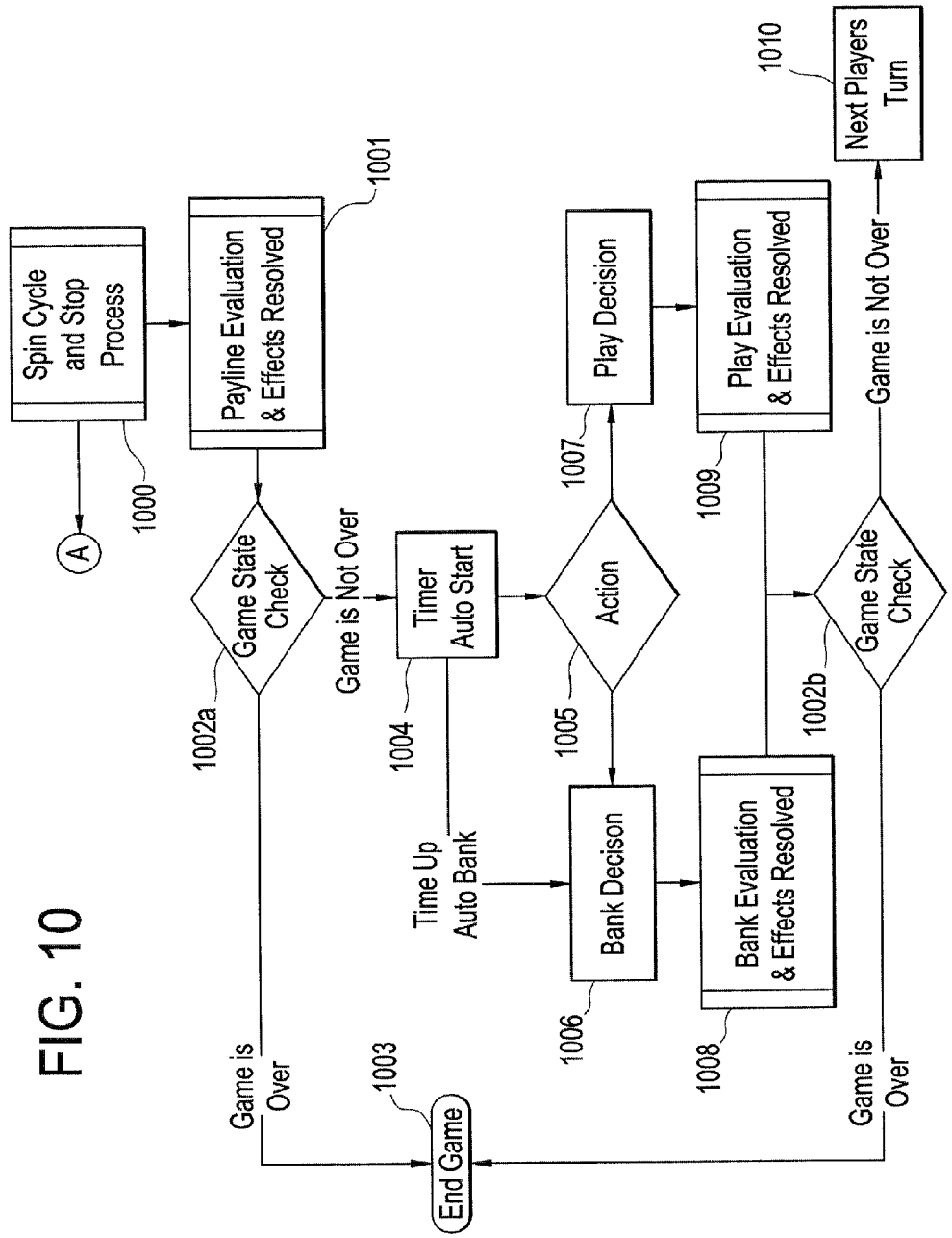
FIG. 10 illustrates a flow diagram for a game interface, in accordance with an example embodiment.

FIG. 10 illustrates a flow diagram for a game interface, in accordance with an example embodiment. Specifically, FIG. 10 illustrates a flow diagram of the interface for handling the combat aspects of the game after receiving pre-combat decisions from the player.

Continuing from the "spin" action 907, of FIG. 9, an outcome is eventually generated by randomly selecting a digital object from each of the digital object holders for inclusion in a payline 1000. For example, in a slot machine like implementation, the digital object holders can be made to stop spinning and a final indication of the digital objects included in the payline can be displayed. The selection process can be resolved after a predetermined amount of time, or a user can force the interface to select immediately (e.g., pressing a stop button to stop the spin animation).

At 1001, the payline is resolved and evaluated for the combat portion of the game. Optionally, additional effects (e.g., digital objects that immediately affect game states of players or opponents, changing a digital object due to a previously game situation, etc.) can also be resolved to finalize the payline.

Once a payline has been resolved, a game state check 1002a, 1002b can be conducted to determine if the game is over (e.g., the player or opponent has run out of hit points, etc.), and if so, then the interface can proceed to 1003 to end the game (e.g., end combat and provide combat results, etc.). Game state check 1002a, 1002b can be conducted at any portion of the flow for the interface.

At 1004, a timer can be used to force the player to commit to one or more decisions within a specific time span. If the timer elapses, then the interface can do a default action (e.g., force a bank decision action 1006). While the timer has not elapsed, the player can decide on a course of action 1005. In the example of FIG. 10, the action may involve a bank decision 1006 to bank the payline, and a play decision 1007 to play the payline. Additionally, a cost (e.g., money units, etc.) may be imposed on the player for conducting a play decision 1007.

When a bank decision 1006 is selected, the interface can conduct an evaluation of the payline based on the bank decision and resolve effects occurring from the bank decision, as shown at 1008. The interface can evaluate the payline based on applying bank decision payoff information of the player's paytable to the payline to obtain a resolution of effects and the adjustment of any game state of the player resulting from banking the payline.

When a play decision 1007 is conducted, the interface can conduct an evaluation of the payline based on the play decision and resolve effects occurring from the play decision, as shown at 1009. The interface can evaluate the payline based on applying play decision payoff information of the player's paytable to the payline to obtain a resolution of effects and the adjustment of any game state of the player and/or one or more opponents resulting from playing the payline.

As explained above, a game state check 1002b may be utilized to determine if the game is over. If the game is not over, then the interface can proceed to conducting the next turn 1010 for another player or an opponent, whereupon the interface can revert to flow diagram state 901 for the next player for the next player or opponent.

FIG. 11 illustrates an example computer system 1100 on which example embodiments may be implemented. The computer system 1100 includes a server 1105 which may involve an I/O unit 1135, storage 1160, and a processor 1110 operable to execute one or more units as known to one of skill in the art. The term "computer-readable medium" as used herein refers to any medium that participates in providing instructions to processor 1110 for execution, which may come in the form of transitory computer readable mediums and non-transitory computer readable mediums. The I/O unit processes input from user interfaces 1140 and operator interfaces 1145 which may utilize input devices such as a keyboard, mouse, touch device, or verbal command.

The server 1105 may also be connected to an external storage 1150, which can contain removable storage such as a portable hard drive, optical media (CD or DVD), disk media or any other medium from which a computer can read executable code. The server may also be connected an output device 1155, such as a display to output data and other information to a user, as well as request additional information from a user. The connections from the server 1105 to the user interface 1140, the operator interface 1145, the external storage 1150, and the output device 1155 may via wireless protocols, such as the 802.11 standards, Bluetooth® or cellular protocols, or via physical transmission media, such as cables or fiber optics. The output device 1155 may therefore further act as an input device for interacting with a user.

The processor 1110 may execute one or more modules. The editing module 1111 is operable to provide an interface for editing digital object holders, as shown in FIG. 3 and may be configured to receive a request to place a digital object associated with a visual representation and a ruleset for using the digital object, at a position on one of the digital object holders; apply the ruleset to the request to generate a first validation result; and provide a first indication of a placement of the requested digital object in the requested position.

The calculating module 1112 may be configured to calculate a paytable that incorporates the request, the paytable comprising a set of possible outcomes for a random selection of one digital object from each of one or more of the plurality of digital object holders, in an interface as shown in FIG. 3. The combat initialization module 1113 may be operable to provide an interface for playing a game as shown in FIG. 7, and may be configured to receive a first plurality of digital objects arranged in a first plurality of digital object holders, and a first paytable for the first plurality of digital object holders associated with the first player, and a first game state of the first player; and receive a second plurality of digital objects arranged in a second plurality of digital object holders, and a second paytable for the second plurality of digital object holders associated with the second player, and a second game state of the second player.

The combat module 1114 for initiating a game between a first player and a second player, the combat module configured to, for each of the first plurality of digital object holders, select a first digital object for inclusion in a first payline in response to receiving a first spin command associated with the first player on a first turn, and similarly, for each of the second plurality of digital object holders, select a second digital object for inclusion in a second payline in response to receiving a second spin command associated with the second player on a second turn.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A non-transitory computer readable medium to store instructions executable by a processor to edit digital object holders for use in a game, the instructions comprising:
   receiving a request to place one or more digital objects at one or more positions on one of the digital object holders, wherein each of the digital objects is associated with a visual representation and a ruleset for placing the digital object into the digital object holder, wherein each of the digital objects has a corresponding number of required positions, cost and a type, wherein at least one of the digital objects has a different number of positions, cost or type than another of the digital objects;
   applying the ruleset to the request to generate a first validation result indicating whether the placement of the one or more digital objects satisfied the ruleset including whether the requested one or more positions for placement of the one more digital objects is valid for the game;
   providing a first indication of a placement of the requested one or more digital objects in the requested one or more corresponding positions for the digital objects calculating a paytable that incorporates the request, the paytable comprising a set of possible outcomes for a random selection of one digital object from each of one or more of the plurality of digital object holders;
   wherein the providing and the calculating are performed, by the processor, for the first validation result having a first value indicative of the request being valid; and
   using the one or more digital objects in the game when the first value is indicative of the request being valid.

2. The non-transitory computer readable medium of claim 1, wherein the paytable comprises bank decision payoff information indicative of a first outcome based on a decision to bank a payline, and play decision payoff information indicative of a second outcome based on a decision to play the payline.

3. The non-transitory computer readable medium of claim 1, wherein the digital object is associated with digital object ability information and digital object payoff information.

4. The non-transitory computer readable medium of claim 3, wherein the calculating the paytable comprises:
  aggregating the digital object payoff information associated with the digital object placed in the requested position and other digital object payoff information associated with other digital objects respectively placed in other positions of the digital object holders, to generate aggregated digital object payoff information;
  calculating the set of possible outcomes by performing permutations of the requested digital object and the other digital objects in the digital object holders, and comparing the aggregated digital object payoff information to the permutations.

5. The non-transitory computer readable medium of claim 3, wherein the digital object payoff information further comprises digital object bank decision payoff information, and digital object play decision payoff information.

6. The non-transitory computer readable medium of claim 3, wherein the digital object ability information comprises at least one of adjustment information of a first game state of a first player, adjustment information of a second game state of a second player, adjustment information for a first plurality of digital object holders associated with the first player, and adjustment information for a second plurality of digital object holders associated with the second player.

7. The non-transitory computer readable medium of claim 1, further comprising:
  receiving a modification request for the calculated paytable;
  applying the ruleset to the modification request to generate a second validation result; and,
  for the second validation result having a second value indicative of the modification request being valid, providing a second indication of a modification to the calculated paytable in accordance with the modification request.

8. The non-transitory computer readable medium of claim 1, wherein using the one or more digital objects in the game produces an outcome of a first player and wherein the outcome of the first player is used to affect a state of the game of a second player.

9. A system, comprising:
  an editing module executable by a processor to edit digital object holders for use in a game, the processor to:
    receive a request to place one or more digital objects at one or more positions on one of the digital object holders, wherein each of the digital objects is associated with a visual representation and a ruleset for placing the digital object into the digital object holder, wherein each of the digital objects has a corresponding number of required positions, cost and a type, wherein at least one of the digital objects has a different number of positions, cost or type than another of the digital objects;
    apply the ruleset to the request to generate a first validation result indicating whether the placement of the one or more digital objects satisfied the ruleset including whether the requested one or more positions for placement of the one more digital objects is valid for the game;
    provide a first indication of a placement of the requested digital object in the requested position;
    a calculating module to calculate a paytable that incorporates the request, the paytable comprising a set of possible outcomes for a random selection of one digital object from each of one or more of the plurality of digital object holders;
    wherein the providing and the calculating are performed for the first validation result having a first value indicative of the request being valid; and
    use the one or more digital objects in the game when the first value is indicative of the request being valid.

10. The system of claim 9, wherein the paytable comprises bank decision payoff information indicative of a first outcome based on a decision to bank a payline, and play decision payoff information indicative of a second outcome based on a decision to play the payline.

11. The system of claim 9, wherein the digital object is associated with digital object ability information and digital object payoff information.

12. The system of claim 11, wherein the calculating module is configured to:
  aggregate the digital object payoff information associated with the digital object placed in the requested position and other digital object payoff information associated with other digital objects respectively placed in other positions of the digital object holders, to generate aggregated digital object payoff information;
  calculate the set of possible outcomes by performing permutations of the requested digital object and the other digital objects in the digital object holders, and comparing the aggregated digital object payoff information to the permutations.

13. The system of claim 11, wherein the digital object payoff information further comprises digital object bank decision payoff information, and digital object play decision payoff information.

14. The system of claim 11, wherein the digital object ability information comprises at least one of adjustment information of a first game state of a first player, adjustment information of a second game state of a second player, adjustment information for a first plurality of digital object holders associated with the first player, and adjustment information for a second plurality of digital object holders associated with the second player.

15. The system of claim 9, further comprising an adjustment module configured to: receive a modification request for the calculated paytable;
  apply the ruleset to the modification request to generate a second validation result; and,
  for the second validation result having a second value indicative of the modification request being valid, providing a second indication of a modification to the calculated paytable in accordance with the modification request.

16. The system of claim 9, wherein using the one or more digital objects in the game produces an outcome of a first player and wherein the outcome of the first player is used to affect a state of the game of a second player.

17. A method of editing digital object holders for use in a game, the method comprising:
  receiving a request to place one or more digital objects at one or more positions on one of the digital object holders, wherein each of the digital objects is associated with a visual representation and a ruleset for placing the digital object into the digital object holder, wherein each of the digital objects has a corresponding number of required positions, cost and a type, wherein at least one of the digital objects has a different number of positions, cost or type than another of the digital objects;

applying the ruleset to the request to generate a first validation result indicating whether the placement of the one or more digital objects satisfied the ruleset including whether the requested one or more positions for placement of the one more digital objects is valid for the game;

providing a first indication of a placement of the requested one or more digital objects in the requested one or more corresponding positions for the digital objects;

calculating a paytable that incorporates the request, the paytable comprising a set of possible outcomes for a random selection of one digital object from each of one or more of the plurality of digital object holders;

wherein the providing and the calculating are performed, by a processor, for the first validation result having a first value indicative of the request being valid; and using the one or more digital objects in the game when the first value is indicative of the request being valid.

18. The method of claim 17, wherein the paytable comprises bank decision payoff information indicative of a first outcome based on a decision to bank a payline, and play decision payoff information indicative of a second outcome based on a decision to play the payline.

* * * * *